United States Patent Office.

SAMUEL G. VAN GILDER, OF PHILADELPHIA, PENNSYLVANIA, ASSIGNOR TO THE AMERICAN PREPARED-FOOD COMPANY, OF SAME PLACE.

METHOD OF DESICCATING SHELL-FISH.

SPECIFICATION forming part of Letters Patent No. 440,519, dated November 11, 1890.

Application filed August 19, 1890. Serial No. 362,437. (No specimens.)

*To all whom it may concern:*

Be it known that I, SAMUEL G. VAN GILDER, a citizen of the United States, residing at Philadelphia, in the county of Philadelphia and State of Pennsylvania, have invented certain new and useful Improvements in Methods of Preparing Food Compounds from Shell-Fish; and I do declare the following to be a full, clear, and exact description of the invention, such as will enable others skilled in the art to which it appertains to make and use the same.

This invention has for its object the production of a method of preparing, manufacturing, concentrating, and refining a nutritious and highly-flavored food product from clams, oysters, and other suitable shell-fish, in combination with a farinaceous substance, as will more fully hereinafter appear.

In carrying out this method the clams, oysters, or other shell-fish are first removed from their shells and separated from their natural liquor by a draining process accompanied by slight compression, if necessary, to expel all the liquor. After this separation the meaty portion of the fish is reduced to a finely-comminuted pulpy mass by chopping, grinding, or in any other suitable manner, in which state it is mixed with a portion of the natural liquor previously separated from the fish, and then subjected to a boiling heat—say 212°. After this cooking process the solid matter is again separated from the liquid and the latter combined with what remains of the raw liquor. Then the combined juices are subjected to a boiling and skimming process to remove all superfluous matter and concentrate and refine the liquor. This boiling and skimming process serves to eliminate objectionable matters floating in the liquor and concentrate and cook the juices, so that the resultant product will be more refined and will keep in a prime condition for any length of time. To this refined and concentrated liquor is then added a suitable quantity of some farinaceous substance—such as flour, meal, cracker-dust, bread-crumbs, &c.—after which the whole is subjected to a boiling temperature, which will serve to cook the same and thicken and coagulate the albuminous and starchy matters contained therein. Then this coagulated mass is thoroughly mixed with the pulpy mass, and the whole subjected to a moderate degree of heat to evaporate all the moisture from it and thereby desiccate it. The heat for the purpose of desiccation may be applied by steam, hot air, the vacuum process, or otherwise, in order that the desiccation may be thorough. After dissication the product is reduced to a granular form and put up into suitable cans or packages for the trade.

The concentrated food product prepared and refined in this manner will keep in a prime condition for an indefinite length of time, and may be used in all the various ways—such as for soups, chowders, fritters, sauces, dressings, &c.—the original flavor being retained in all cases and greatly augmented by concentration.

Having thus fully described my invention, what I claim is—

1. The method herein described of manufacturing a refined desiccated food product from oysters, clams, or other shell-fish, which consists in first separating by straining the meat from the natural liquor, then finely comminuting the meat, and then mixing it with a portion of its juices and raising the mixture to approximately the boiling-point, then straining again and mixing this separated liquor with the previously-separated raw liquor, then boiling and skimming this combined liquor to refine and concentrate it, then thoroughly mixing this refined and concentrated liquor with a suitable quantity of farinaceous substance and cooking this mixture, then thoroughly mixing this farinaceous mass with the previously-cooked and separated meat pulp, and then desiccating the product, substantially as described.

2. The process herein described of preparing a refined desiccated food product from clams, oysters, or other shell-fish, which consists in separating the fish from its natural liquor, comminuting and cooking the meaty substance, concentrating and refining the raw liquor by boiling and skimming, mixing this concentrated liquor with a farinaceous substance and cooking the same, and finally mixing the pulpy mass of meat with the mass of farinaceous substance and desiccating the product, substantially as described.

In testimony whereof I affix my signature in presence of two witnesses.

S. G. VAN GILDER.

Witnesses:
CHAS. D. DAVIS,
H. J. ENNIS.